US009060292B2

(12) United States Patent
Callard et al.

(10) Patent No.: US 9,060,292 B2
(45) Date of Patent: Jun. 16, 2015

(54) SYSTEMS AND METHODS FOR PREDICTIVE DOWNLOADING IN CONGESTED NETWORKS

(71) Applicant: FutureWei Technologies, Inc., Plano, TX (US)

(72) Inventors: Aaron Callard, Ottawa (CA); Alex Stephenne, Stittsville (CA); Petar Djukic, Ottawa (CA)

(73) Assignee: Futurewei Technologies, Inc., Plano, TX (US)

( * ) Notice: Subject to any disclaimer, the term of this patent is extended or adjusted under 35 U.S.C. 154(b) by 155 days.

(21) Appl. No.: 13/734,439

(22) Filed: Jan. 4, 2013

(65) Prior Publication Data

US 2013/0176846 A1   Jul. 11, 2013

Related U.S. Application Data

(60) Provisional application No. 61/583,973, filed on Jan. 6, 2012.

(51) Int. Cl.
*G01R 31/08* (2006.01)
*H04W 28/02* (2009.01)
*H04L 29/08* (2006.01)

(52) U.S. Cl.
CPC ........... *H04W 28/0215* (2013.01); *H04L 67/06* (2013.01); *H04L 67/325* (2013.01)

(58) Field of Classification Search
None
See application file for complete search history.

(56) References Cited

U.S. PATENT DOCUMENTS

| 5,684,861 | A  | * | 11/1997 | Lewis et al. | 455/405 |
| 6,717,547 | B2 | * | 4/2004  | Spilker et al. | 342/464 |
| 7,826,469 | B1 | * | 11/2010 | Li et al. | 370/412 |
| 8,209,291 | B1 | * | 6/2012  | Ma et al. | 707/644 |
| 2006/0115238 | A1 | | 6/2006 | Sako et al. | |
| 2007/0174201 | A1 | | 7/2007 | Sako et al. | |
| 2010/0174823 | A1 | * | 7/2010 | Huang | 709/230 |
| 2010/0202287 | A1 | * | 8/2010 | Diaz et al. | 370/230 |
| 2010/0332586 | A1 | * | 12/2010 | Jogand-Coulomb et al. | 709/203 |
| 2013/0176846 | A1 | * | 7/2013 | Callard et al. | 370/230 |

FOREIGN PATENT DOCUMENTS

| CN | 1342295 | 3/2002 |
| CN | 101110844 | 1/2008 |
| CN | 101369280 | 2/2009 |
| CN | 102137148 | 7/2011 |
| CN | 102711072 | 10/2012 |

OTHER PUBLICATIONS

Written Opinion and Search Report of International Application Serial No. PCT/CN2013/070111, Huawei Technologies Co., Ltd., mailed Apr. 11, 2013, 13 pages.

* cited by examiner

*Primary Examiner* — Robert Wilson
(74) *Attorney, Agent, or Firm* — Slater & Matsil, L.L.P.

(57) ABSTRACT

An embodiment user equipment has a list of predictive data that a user may request, and programming to receive prefetched data based on the list of predictive data at a reduced cost, wherein the reduced cost is lower than a network cost of downloading the data, and to store the prefetched data within the UE for future consumption. An embodiment base station has a list of predictive data a UE may request, a high priority queue for data requested by the UE, and a low priority queue with predictive data corresponding to the list of predictive data. The base station further includes programing to send the requested data and to send the predictive data.

20 Claims, 3 Drawing Sheets

SYSTEMS AND METHODS FOR PREDICTIVE DOWNLOADING IN CONGESTED NETWORKS

This application claims the benefit of U.S. Provisional Application No. 61/583,973, filed on Jan. 6, 2012, entitled "Systems and Methods for Predictive Downloading in Congested Networks," which application is hereby incorporated herein by reference.

TECHNICAL FIELD

The present invention relates generally to communications methods and systems, and, in particular embodiments, to a system and method for downloading information in a communications network.

BACKGROUND

Communications networks provide communications between network elements. For example, a communications network, such as a wireless communications network, allows users to access remote information. The amount of data accessed and downloaded by a user may be significant and may cause delays in response time with respect to the amount of time a user waits for the requested data.

With regard to data accesses, particularly downloads, it is generally accepted that a user's downloading habits are predictable and the cost of transmitting/receiving data changes dramatically over time (e.g., systems are often under-loaded). Current technologies involving predictive downloading focus on the user application level. Specific applications in user equipment (UE) may use predictive downloading to prefetch data and minimize response time when a user actually requests data.

SUMMARY OF THE INVENTION

These and other problems are generally solved or circumvented, and technical advantages are generally achieved, by preferred embodiments of the present invention, which allows for predictive downloading in predictive networks.

In accordance with an embodiment of the present invention, a method includes determining (see FIG. 5A, step 502) a list of predictive data at a user equipment (UE), receiving (see FIG. 5A, step 504) prefetched data at the UE corresponding to the list of predictive data. The UE is charged a reduced bandwidth for receiving the prefetched data, wherein the reduced bandwidth is lower than a network bandwidth used, by a network, to transmit the prefetched data to the UE. The method further includes storing (see FIG. 5A, step 506) the prefetched data within the UE for future consumption.

In accordance with another embodiment of the present invention, user equipment (UE) includes a non-transitory computer readable storage medium storing instructions and a processor, which when executing the instructions in the non-transitory computer readable storage medium performs the following: determine a list of data the UE may request in the future, download data based on the list, and store the data in the UE. The UE is charged a reduced bandwidth for receiving the prefetched data, wherein the reduced bandwidth is lower than a network bandwidth used, by a network, to transmit the data to the UE.

In accordance with another embodiment of the present invention, a method includes transmitting requested data requested by a user equipment (UE) from a base station (BS), determining, by the BS, a list of predictive data the UE may request, generating a low priority queue of predictive data based on the list, wherein the low priority queue is set a priority level lower than the priority level of the requested data transmitted by the BS, and transmitting predictive data from the low priority queue. The method further includes charging the UE a reduced bandwidth for the predictive data, wherein the reduced bandwidth is lower than a network bandwidth used to transmit the predictive data to the UE.

In accordance with yet another embodiment of the present invention, a base station (BS) includes a non-transitory computer readable storage medium storing instructions and a processor, which when executing the instructions in the non-transitory computer readable storage medium performs the following: create a high priority queue (see FIG. 5B, step 552) for data requested by a user equipment (UE) at the BS, send requested data (see FIG. 5B, step 554) from the high priority queue; receive (see FIG. 5B, step 556) a list of potential data the UE may request, create a low priority queue (see FIG. 5B, step 558) corresponding with the potential data, wherein the low priority queue has a priority level less than the priority of the high priority queue, and send (see FIG. 5B, step 560) potential data to the UE. The UE is charged a reduced bandwidth, wherein the reduced bandwidth is less than a network bandwidth used to send the potential data to the UE (see FIG. 5B, step 562).

An advantage of an embodiment is it allows for UEs to receive predictive data without paying for the data unless the data is actually used.

A further advantage of an embodiment is it utilizes periods when a network is underloaded to send predictive data to a UE, allowing the network to maximize throughput.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Predictive downloading at the user application level ignores network load, and fails to take advantage of times when a network is under-loaded to prefetch data and maximize network efficiency. Furthermore, under current approaches, users are charged by the network for any prefetched data, even if the users do not ultimately request the data. Therefore, users may be charged for data that they do not actually need. Accordingly, a system and method for predictive downloading in congested networks is provided to address these concerns.

Various embodiments are described with respect to preferred embodiments in a specific context, namely a wireless network. The invention may also be applied, however, to other networks, such as wireline, optical networks, or combinations of these networks.

Figure 1:
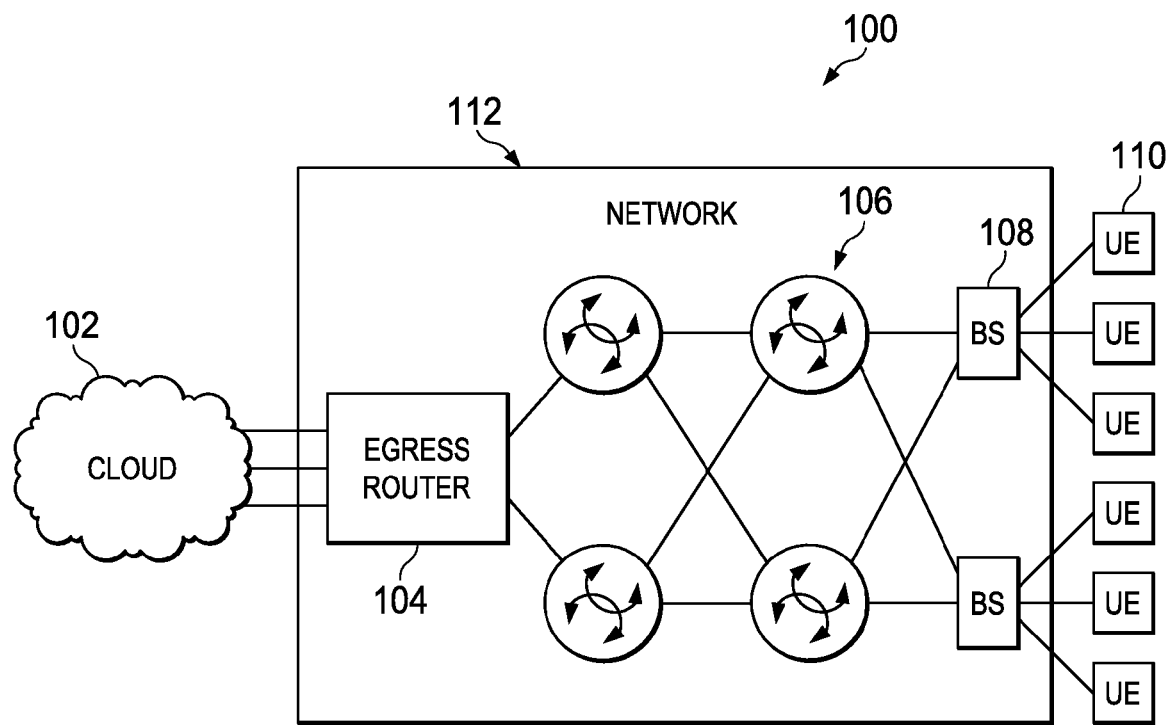
FIG. 1 is a block diagram illustrating a networking system that may be used for implementing, for example, the devices and methods described herein, in accordance with an embodiment.

FIG. 1 illustrates a block diagram of a networking system 100 according to an embodiment. Data cloud 102 represents the pool of data available to the network 112. Data cloud 102 may represent, for example, the Internet. Network 112 comprises an egress router 104, a number of intermediate routers 106, and base stations 108. Egress router 104 labels individual data packets leaving cloud 102 with their priority level. Intermediate routers 106 transfer the data packets to an appropriate base station 108 corresponding to a target UE 110. The base station 108 then schedules the transmission of the data packets based on the packets' priority levels to the target UE 110. In an embodiment, base station 108 may be an evolved Node B. FIG. 1 illustrates system 100 comprising a specific number of components (e.g., four intermediate routers, two base stations, and six UEs); however, other embodiments contemplate system 100 comprising any number of these and other components. Furthermore, base stations 108 apply primarily to wireless network systems and may not apply to other network systems in other embodiments. For example, in a wireline network, base stations 108 would be replaced with an appropriate local area router scheduling data packet deliveries to the UEs 110.

According to an embodiment, system 100 predicts what various users will download ahead of time (predictive data), and then sends this predictive data to an UE 110 when the cost to network 112 is low. For example, system 100 may comprise a transparent daemon that analyzes downloading history in the past and predicts data the user may want in the future. This daemon indicates to network 112 what predictive data may be prefetched for the user at low traffic periods (hereinafter prefetched data or prefetched object). Network 112 may set a very low queuing priority for prefetched data. Base stations 108 could schedule these queues as large delay tolerant data, essentially maximizing throughput in an unfair sense. UE 110 then pays the network for this prefetched data only if it is actually used. This paying mechanism may be achieved, for example, via UE 110 downloading a key to decrypt the data at the cost of the bandwidth used before to download the prefetched data.

Figure 2:
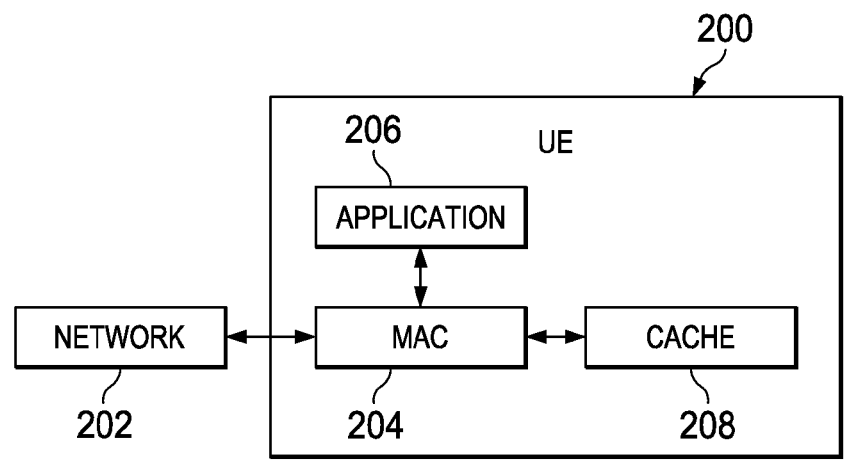
FIG. 2 is a block diagram of an user equipment (UE) that may be used for implementing, for example, the devices and methods described herein, in accordance with an embodiment.

FIG. 2 illustrates a block diagram of a UE 200 receiving data from a network 202 according to an embodiment. UE 200 and network 202 may correspond to a specific UE 110 and network 112 in FIG. 1. A media access controller (MAC) 204 downloads predictive data based on a generated list to a download cache 208. At the time predictive data is downloaded, the user is not charged by network 202 for the cost of the download. In an alternate embodiment, the user is charged a reduced cost (i.e., a cost lower than the full bandwidth cost of the downloading the data) for the download.

In an embodiment, a daemon transparent to the user controls the generation and downloading of this prefetched data. This daemon may exist in several places, for example, at UE 200, within a specific application 206's server, or at network 202. The daemon may also exist concurrently within several different places with the possibility of overlap of what tasks the daemon can perform at each location. It is therefore contemplated in alternate embodiments for the various combinations of daemon activity contributing in combination to download prefetched data to UE 200.

In an embodiment, the daemon exists within UE 200. The daemon monitors a user's past and present download history and generates information based on patterns observed. The daemon may also monitor various user specific statistics such as location, battery life, time of day, cache size available, etc. The daemon may create a database that comprises of two parts: a predictive data list and copies of prefetched data. The predictive data list keeps track of the user's download history and generates a list of predictive data for the user. For example, this first part can keep a list of the user's visited uniform resource locators (URLs), the number of times an URL was downloaded, the frequency of those downloads, and the time frame for which downloaded information is valid. The daemon then knows when the user's information has become stale and may prefetch this information before the user asks for it.

The user may also proactively set this predictive data list with a list of interested objects and a refresh rate for these objects. These pro-active objects may also be added to the database by an application 206, which operates in the UE, eliminating the need for the user to intervene and decide which objects may be prefetched. Some exemplary applications 206 are news websites, weather, or stock information which may be downloaded at regular intervals, or easy to identify videos from websites such as YouTube and Netflix (e.g., a user's regularly scheduled TV programs). Provisions for these kinds of example applications are present in many content centric network schemes(e.g., CCNx).

The second part of the database, copies of prefetched data, keeps a copy of the prefetched objects that MAC 204 has downloaded and links these objects back to the predictive data list. Some of these prefetched objects may have many parts (e.g., a webpage consists of an Hypertext Markup Language (HTML) text file and binary picture objects). The prefetched objects may also comprise many sub-objects that may be serialized into a single file for easier storage in the database.

An example implementation of the second part of the database is a download cache 208 similar to a web cache. Typically, a web cache decreases the load on the network since it allows the user to view the same object multiple times, without downloading it every time. In this case download cache 208 allows the network to push the objects to the user's device and stores the objects for later, even if the user did not request the objects.

In an alternate embodiment of the second part of the database, a virtual firewall and cache may be introduced within UE 200. This firewall intercepts some or all communications leaving UE 200 and using conventional algorithms redirects data to the cache if applicable. Examining the most commonly hit data, a list of predictive data is constructed, and a set of prefetched data may be downloaded to the cache.

In an alternate embodiment, the daemon exists within network 202. The traffic generated by a particular UE, such as UE 200, may be monitored and compared to other similar traffic patterns or UE 200's past traffic history. A list of predictive data may then be generated using a predictive algorithm.

In an embodiment, the system may be optimized such that network 202 can keep track of parts of a database similar to the database generated by a daemon residing within UE 200. For example, the network may retain a copy of portions of the predictive data list (the first part of the database) at no cost. Because the user downloads objects from network 202, network 202 already has a list of past downloaded objects. Therefore, network 202 has the access to a list of downloaded URL's, the frequency of a URL's downloads, and the time frame for which downloaded information is valid. Because network 202 has a copy of this part of the database, UE 200 need not inform network 202 about which objects are becoming stale and should be prefetched for the user.

For pro-active objects that may be a portion of the first part of the database, network 202 can collaborate with network services over its backbone to become aware of the objects that the user may want to download in the future, such as TV programs. This eliminates or reduces the need for communication between network 202 and UE 200 to obtain this information. For other pro-active objects, UE 200 may explicitly notify the network with the objects it wishes to download in a pro-active fashion. For example, network 202 could read a prefetch tag present in HTML5 and some predecessors. In this scheme the application indicates, as part of an object request, that the object is being prefetched, and the above schemes would be applied to that data. Note that a different type of flow control (i.e. other than unmodified TCP) may be applied to this traffic as the behavior may be quite different.

In an embodiment, an optimization network 202 may also keep a copy of portions of the copies of prefetched data (the second part of the database). This copy may be shared by multiple users since the URLs stored in part one of the database uniquely identify objects. An advantage of this embodiment is that it allows network 202 to save backbone bandwidth by not fetching the same object multiple times for different users. Note that multicast/broadcast messages can be used to deliver data to more than one user at once.

For example, a prefetched object may be pushed to user A at time t1. At some later time t2 (t2 being greater than t1), a different user B requests the same object. Since network 202 already has a copy of this object, it can deliver the object to user B more quickly and cheaply than if the object had to download from the Internet. In another example, user A may download an object at time t1. The network object is then later requested by user B at time t2 (t2 being greater than t1). Network 202 determines that the object downloaded at t1 is no longer fresh, so it downloads a fresh version over its backbone. Network 202 then keeps a copy of the updated object so that the updated object may be prefetched for user A when the network is under-loaded. The network thus saves backbone bandwidth by only having to download the updated object once.

In another embodiment, the daemon may also exist within an application server. Specific applications, such as application 206 in UE 200, could generate predictive lists based on an UE 200's activity and download prefetched data from its server. For example, a video application (e.g., Netflix) could pre-download the next video of a series or subscriber applications (e.g., podcasts) could automatically download new subscriber data.

The application server may also keep a list of predictive data. This list is based on the user's preferences and previous use, both of which are known to the application server. The application server pushes this list and the objects to network 202. Network 202 may then prefetch the objects for the user when it is under-loaded. Alternatively, the application server may provide network 202 with information about how fresh certain objects need to be in order to be relevant to a user. The freshness requirements for specific objects may vary. For example, weather data should to be refreshed every few hours or more frequently to remain fresh, whereas an episode of a TV may remain fresh for days, weeks, or years. Network 202 may automatically download updated objects and push them to UE 200.

In another embodiment the application may be a proxy server, or other portion of a CDN network within a Relay node. For instance, a proxy server would provide a list of data to download representing common objects that have expired that are likely to be requested again. It may then maintain the freshness of its cache longer.

In an embodiment, the prefetched data list may also include additional information regarding the data. It may include, for example, the location of the data requested, its probability of use, and the freshness of the data. The prefetched data information may also include additional information having to do with data transmission. For example, the information may include percentage that has already been received, which portions of the information have been received, and encryption keys. This information may be kept as a list within the daemon.

Figure 3:
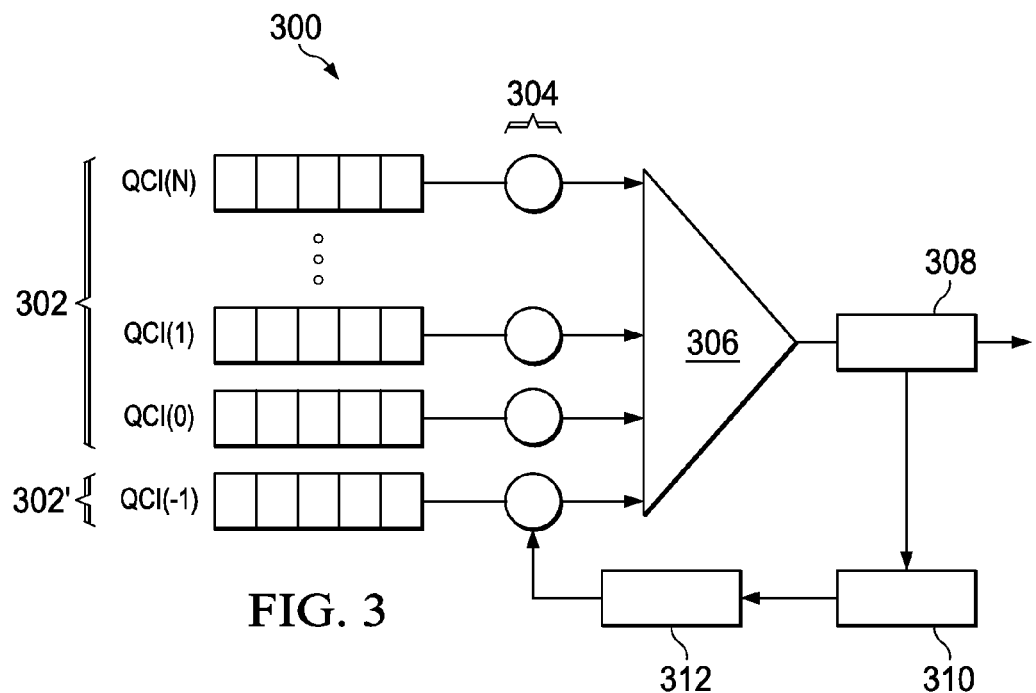
FIG. 3 is a flow diagram of a scheduler that may be used for implementing, for example, the devices and methods described herein, in accordance with an embodiment.

FIG. 3 illustrates a flow diagram of a scheduler 300, which may be used for implementing various embodiments. Network scheduler 300 may reside within a base station 108 in FIG. 1. Scheduler 300 may push prefetched data to a user at a very low network priority. In an embodiment, the priority of this prefetched data may be chosen to be lower than one or more other types of data requested by a user. Scheduler 300 may use priority-based scheduling of data. The combination of setting the prefetched data at a low priority and the priority scheduling may be used to restrict or limit the transmission of the prefetched data to periods of lower network usage. Lower network usage periods may be periods when all other data has already sent by the network. This allows for higher network utilization if active user traffic is low, and ensures that prefetched data traffic does not interfere with other traffic.

In an embodiment, individual queues 302 are created for each user organized by each piece of data's priority level, quality of service (QoS) class identifier (QCI): QCI(0), QCI (1), . . . , QCI(N). Predictive data is placed in queue 302' with a priority, QCI(−1), which is a new priority level below all others. Different users may compete for resources to receive data in queues 302 using methods known in the art regarding current networks (e.g., highest priority first or a weighted queue scheduling in which different queues are assigned fixed weights in proportional fair scheduling) Scheduler 306 coordinates data to be delivered to a user based on service rates set at nodes 304. Because prefetched data has the lowest priority of the data among all of the users, it is sent to users last and only if the network has allocated surplus throughput for the higher priority data. The probability of use and additional information may be used to weight individual users to determine who receives predictive data. Regarding predictive data, transmission scheduling may not achieve network fairness as is known in the art, such as proportional fairness. Regarding prefetched data, the goal is not fairness but rather to maximize or increase the overall rate of network transmissions. While fairness may be achieved for regular data in queues 302, the fairness among data in queue 302' (predictive data) may not be achieved.

Scheduler 300 may be an utility-based scheduler, meaning the scheduler calculates a utility for each user and tries to maximize the assigned utility based on sub-optimal or optimal scheduling techniques. One type of scheduler is the proportionally fair (PF) scheduler in which the overall utility function to be maximized is:

$$r\_instant/r\_ave$$

wherein r_instant is the achievable data transfer rate and r_ave is the average rate of data transferred over some time window. The utility of sending a particular piece of data may be calculated at node 308. Node 310 then estimates a fair rate based on the utilities calculated at node 308 while trying to maximize the overall utility function above. Node 312 sets the service rates for different queues 302 and 302' at nodes 304 based on the fair rate estimated at node 310. Finally scheduler 306 delivers data to the user based on the service rates set in nodes 304.

The utility for sending a particular piece of predicted data to a user may be calculated based on the equation:

$$(r\_instant * probability\ of\ use * scaling\ constant) - x$$

wherein, x is a value used to represent various factors, such as interference generated to users outside of the cell, battery consumption by UE in reception, electricity consumption by the base station, etc. The value of x may change over time depending on an UE's condition. The scaling constant is present for comparison between the data's priority level and others. The scaling constant of predictive data may be low to prevent this type of data from transmitting when other types of data are present.

Because UE's may be in hibernation mode when the network wants to send predictive data, the UE may be need to be woken up in order to receive data. The overhead required as well as battery consumed may be factored into the utility function when considering whether to transmit this data or not. For example, the calculation of the variable x above may factor in overhead costs, and the scheduler will only send predictive data if the utility function for sending that piece of data is positive. In an embodiment, r_instant is approximated for these users in hibernation mode based on last known channel qualities.

Predictive data may be delivered to queue 302' using a variety of methods. In one embodiment, the network may keep a copy of predictive data from previous transmissions, so that the data already exists in queue 302'.

In another embodiment, large predictive data packets (e.g., objects that are several MB or GB in size) will not be downloaded at once. In such cases, if the application server supports a network coding protocol, the data may be downloaded one network coded packet at a time from the application server. If the application server does not support a network coding protocol, then the large predictive data will be downloaded by the network using some other protocol. For example, it may be downloaded only in portions if partial downloading and resuming is allowed (i.e., Rsync, etc). Division of data into web objects presents a natural way to divide the large data into more manageable chunks of data. Each object is uniquely identified and smaller in size than the full set of objects. Larger objects may be downloaded by a protocol that has a resume feature. For example the file transfer protocol (FTP) allows resuming of previously started transmissions with its REST command.

At the network, large predictive data packets may be broken down into many smaller packets, which are network coded with each other. These smaller packets sit in the upper levels of the network and may be requested by individual base stations as needed. When a base station predicts that it will have available bandwidth, the base station may start obtaining the predictive data by sending a request for it. This data is sent to the base station, using a very low priority, similar to how the data is delivered from the base station to an UE. If the backhaul network is congested, this priority-based delivery system may prevent the predictive data from increasing congestion significantly. Network coding is only an example implementation and may not be present in various alternate embodiments.

Referring back to FIG. 2, in an embodiment a user does not pay for prefetched data, but is charged for this prefetched data when it is used. In an alternative embodiment, a user only pays a reduced cost for prefetched data, but is charged for remainder when the prefetched data is used. In FIG. 2, the user may requests access to a piece of prefetched data stored in cache 208 through application 206. MAC 204 provides application 206 with the data, and MAC 204 also processes billing for the used prefetched data with network 202.

In an embodiment, each piece of prefetched data is encrypted with an individual key. MAC 204 must request the key to decrypt the prefetched data prior to sending the data to application 206. This request would indicate that data's usage, and it would cause that user's account to be charged by network 202 for the cost of sending the prefetched data. Network 202 may also check the prefetched data for freshness when a request for a key is made. The network would then be able to verify that the data sent to the UE is still fresh, and inform the UE as such.

In an alternative embodiment, MAC 204 simply informs network 202 whenever prefetched data is accessed, without the use of individual encryption keys. For this method, MAC 204 may be a trusted application by network 202, facilitating payment and ensuring that the user is not cheating. One way to implement MAC 204 in a secure manner is to encrypt prefetched data on the network side and share the encryption key only with MAC 204. One key is used to encrypt all of the prefetched data at the same time. MAC 204 decrypts the part of the data that the user requested using its keys and notifies network 202 that the data was accessed.

In yet another embodiment, network 202 assigns each user credits, which is stored in a trusted application MAC 204 on UE 200. Instead of contacting the network every time the data is accessed, MAC 204 checks if the user has credits left. If the user has enough credits to access the data, the data is sent to the user for consumption. If the user does not have enough credit, the MAC 204 contacts network 202 to get more credits for the user. The advantage of this method is that amount of traffic consumed by network 202 to charge for content is decreased.

Figure 4:
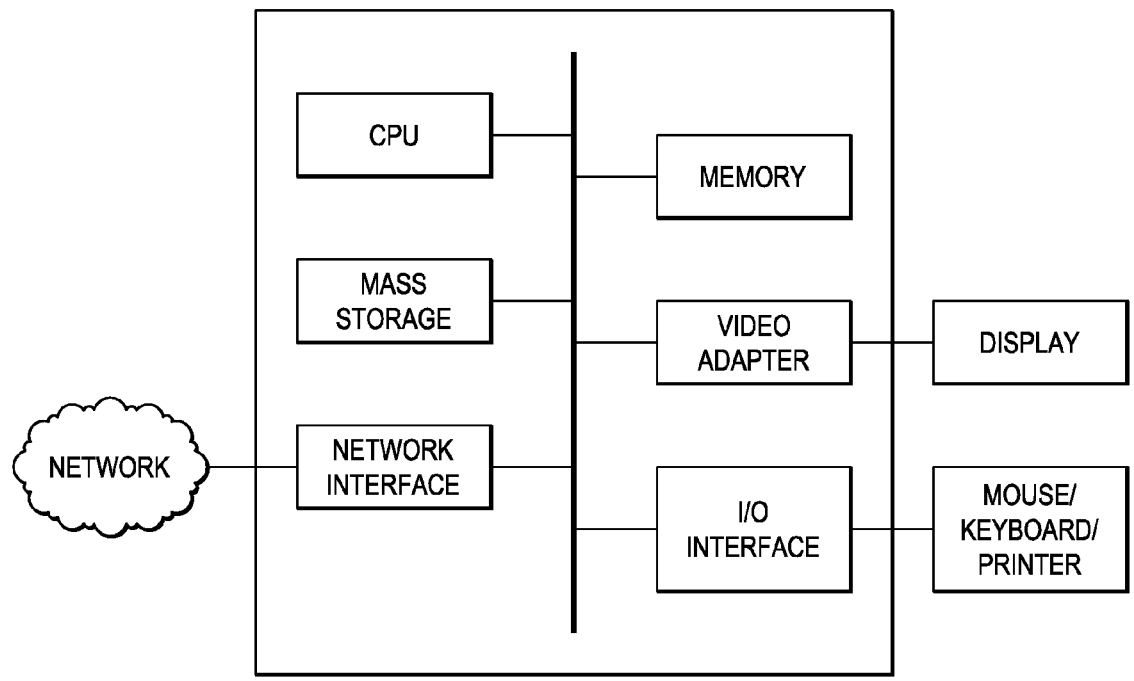
FIG. 4 is a block diagram illustrating a computing platform that may be used for implementing, for example, the devices and methods described herein, in accordance with an embodiment.
Figures 5A, 5B:
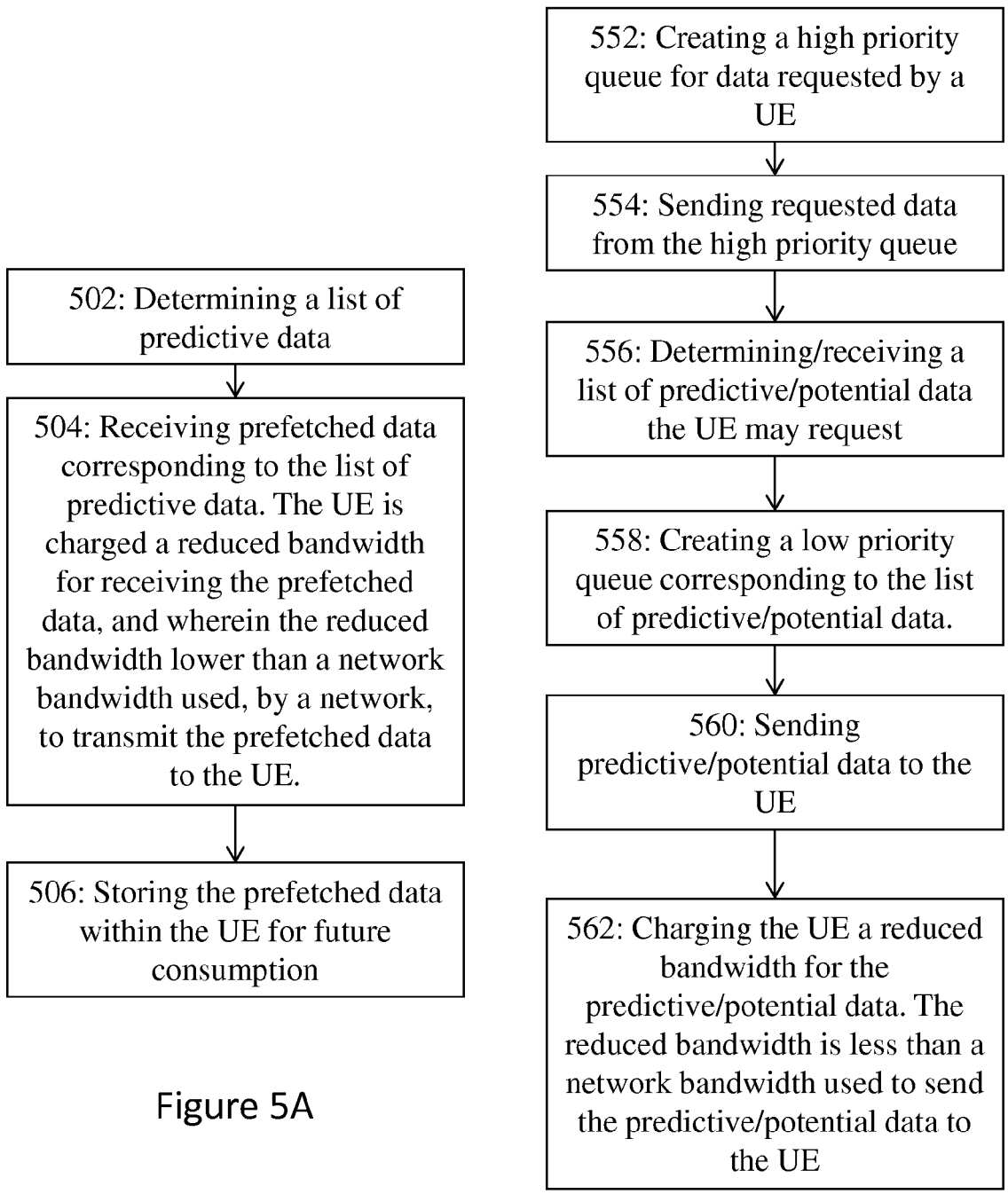
FIG. 5A illustrates a process flow of network device (e.g., user equipment (UE) activity) in accordance with an embodiment.
FIG. 5B illustrates a process flow of network device (e.g., base station (BS) activity) in accordance with an embodiment.

FIG. 4 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for prefetching data, said method comprising:
   determining, by a user equipment (UE), a list of predictive data;
   receiving prefetched data at the UE corresponding to the list of predictive data over a network;
   paying, by the UE, a reduced bandwidth for receiving the prefetched data, wherein the reduced bandwidth is lower than a network bandwidth used, by the network, to transmit the prefetched data to the UE; and
   storing the prefetched data within the UE.

2. The method of claim 1, wherein the paying, by the UE, the reduced bandwidth comprises paying, by the UE, zero bandwidth for receiving the prefetched data.

3. The method of claim 1, further comprising paying a remainder bandwidth for the prefetched data when the prefetched data is consumed by the UE, wherein the remainder bandwidth is a difference between the reduced bandwidth and the network bandwidth.

4. The method of claim 3, wherein receiving the prefetched data comprises receiving encrypted prefetched data, and, wherein paying for the prefetched data comprises receiving an encryption key to unlock the encrypted prefetched data when the UE pays the remainder bandwidth.

5. The method of claim 3, further comprising informing, by an application at the UE, the network when the prefetched data is consumed and paying the remainder bandwidth.

6. The method of claim 3, further comprising:
   receiving, by the UE, credits for network bandwidth;
   checking, by an application at the UE, a credit amount when the prefetched data is consumed, wherein the credit amount corresponds to a number of credits at the UE; and
   when the credit amount is greater than or equal to the remainder bandwidth, reducing credits by the remainder bandwidth; or
   when the credit amount is less than the remainder bandwidth, paying, by the UE, for additional credits.

7. The method of claim 1, wherein receiving the list of predictive data comprises monitoring data consumed by the UE, by a transparent daemon at the UE, and generating the list of predictive data based on the monitored data consumed by the UE.

8. The method of claim 1, wherein storing the prefetched data comprises storing the data in a download cache and providing the UE with a database linking the prefetched data with the list of predictive data.

9. User equipment (UE) comprising:
   a non-transitory computer readable storage medium storing instructions;
   a processor which when executing the instructions in the non-transitory computer readable storage medium performs the following:
   determine a list of data the UE may request in the future;
   download data over a network in accordance with the list;
   pay a reduced bandwidth for receiving the data, and wherein the reduced bandwidth is lower than a network bandwidth, used the network, to transmit the data to the UE; and
   store the data in the UE.

10. The UE of claim 9, wherein the UE pays zero bandwidth for receiving the data.

11. The UE of claim 9, wherein the non-transitory computer readable storage medium stores additional instructions, which when executed by the processor performs the following: to pay a remainder bandwidth for the data if the data is consumed by the UE, wherein the remainder bandwidth is a difference between the reduced bandwidth and the network bandwidth.

12. A method for transmitting data, said method comprising:
   determining, by a base station (BS), a list of predictive data a user equipment (UE) may request;
   generating a low priority queue of predictive data in accordance with the list of predictive data, wherein the low priority queue is set at priority level lower than a priority level of requested data requested by the UE from the BS;
   transmitting predictive data from the low priority queue; and
   charging the UE a reduced bandwidth for the predictive data, wherein the reduced bandwidth is lower than a network bandwidth used to transmit the predictive data to the UE.

13. The method of claim 12, wherein charging the UE the reduced bandwidth for the predictive data comprises charging the UE zero bandwidth for the predictive data.

14. The method of claim 12 further comprising:
   receiving notice that the predictive data was requested by the UE; and
   charging the UE for a remainder bandwidth, wherein the remainder bandwidth is a difference between the reduced bandwidth and the network bandwidth used to transmit the predictive data.

15. The method of claim 12, further comprising:
receiving, by the BS, a request for data; and
transmitting, by the BS, the data in accordance with the request, wherein transmitting the predictive data occurs when the BS has excess bandwidth after transmitting the data in accordance with the request.

16. The method of claim 15, wherein transmitting the data in accordance with the request and transmitting the predictive data comprises scheduling transmissions using a proportionally fair utility based scheduler.

17. The method of claim 12, wherein providing the BS with a list of predictive data comprises:
monitoring, by a transparent daemon at the BS, monitoring data transmission history to the UE; and
generating the list of predictive data the UE may request in accordance with the monitored data transmission history.

18. A base station (BS) comprising:
a non-transitory computer readable storage medium storing instructions;
a processor which when executing the instructions in the non-transitory computer readable storage medium performs the following:
create a high priority queue for data requested by a user equipment (UE);
send requested data from the high priority queue;
receive a list of potential data the UE may request;
create a low priority queue corresponding to the potential data, wherein the low priority queue has a priority level less than the high priority queue;
send potential data to the UE; and
charge the UE a reduced bandwidth for the potential data, wherein the reduced bandwidth is less than a network bandwidth used to send the potential data to the UE.

19. The BS of claim 18, wherein the non-transitory computer readable storage medium stores additional instructions, which when executed by the processor performs the following: receive notification when the potential data is requested by the UE and charging the UE for a remainder bandwidth, wherein the remainder bandwidth is a difference between the reduced bandwidth and the network bandwidth used to send the potential data to the UE.

20. The BS of claim 18, wherein the UE is charged zero bandwidth for the potential data.

* * * * *

UNITED STATES PATENT AND TRADEMARK OFFICE
CERTIFICATE OF CORRECTION

PATENT NO. : 9,060,292 B2  
APPLICATION NO. : 13/734439  
DATED : June 16, 2015  
INVENTOR(S) : Aaron Callard et al.

It is certified that error appears in the above-identified patent and that said Letters Patent is hereby corrected as shown below:

In the Claims

In Col. 10, line 32, claim 9, delete "used the network," and insert --used by the network--.

Signed and Sealed this  
Tenth Day of November, 2015

Michelle K. Lee  
*Director of the United States Patent and Trademark Office*